EPITAXIAL SELENIUM COATING ON TELLURIUM SUBSTRATE

Filed April 11, 1966 2 Sheets-Sheet 1

Clifford H. Griffiths Inventor

By Cushman, Darby & Cushman Attorneys

May 26, 1970 C. H. GRIFFITHS 3,514,323

EPITAXIAL SELENIUM COATING ON TELLURIUM SUBSTRATE

Filed April 11, 1966 2 Sheets-Sheet 2

Inventor
Clifford H. Griffiths
By Cushman, Darby & Cushman
Attorneys

United States Patent Office 3,514,323
Patented May 26, 1970

3,514,323

EPITAXIAL SELENIUM COATING ON TELLURIUM SUBSTRATE

Clifford H. Griffiths, Pointe Claire, Quebec, Canada, assignor to Noranda Mines Limited, Toronto, Ontario, Canada Filed Apr. 11, 1966, Ser. No. 541,551
Claims priority, application Great Britain, Apr. 20, 1965, 16,596/65
Int. Cl. C23c 13/04
U.S. Cl. 117—201 6 Claims

ABSTRACT OF THE DISCLOSURE

A film of precisely oriented selenium is produced by effecting epitaxial growth of selenium on a substrate of single-crystal tellurium. The deposition of selenium from selenium in the vapour phase is effected on a selected face of the tellurium crystal, the face chosen determining the plane of the selenium film so produced.

This invention relates to a method of producing precisely oriented and single crystal layers of the hexagonal allotrope of selenium. This allotrope has application for example in a number of electrical devices, including rectifiers, photoconducting cells and photovoltaic cells.

Methods of making selenium electrical devices have previously produced layers of selenium which are polycrystalline, and at best show only some degree of fibre orientation. The known anisotropy of the electrical conductivity of selenium can only be fully utilized in electrical devices if the selenium layer has a complete and predictable orientation.

Single crystals of selenium have been produced in bulk, but these are not suitable for electrical devices which require thin layers.

Selenium layers have been grown epitaxially on a number of cleaved or polished alkali halide single crystal faces with double and quadruple orientations of specific selenium faces, but the multiple orientations of the selenium faces do not enable the anisotropic properties of the electrical conductivity of selenium to be used in the same way as precisely oriented layers.

According to the present invention, there is provided a method of producing a film of precisely oriented selenium composing effecting epitaxial growth of selenium on a substrate of single crystal tellurium. Preferably the selenium is deposited on the tellurium from the selenium vapour, and is subsequently melted on the tellurium and then allowed to cool slowly to form a layer with single crystal orientation.

The highly oriented state of the selenium layers provide a film which is uniform in thickness so that a thinner film may be used without the penalty of high resistance and of the possibility of discontinuities. Such films are believed to have a predictable and highly reproducible electrical properties and enable the anisotropy of electrical and other physical properties of single crystal and oriented selenium to be exploited. The selenium films are bonded by molecular forces to the substrate and thus have minimum electrical resistance.

Examples of the invention will now be described with reference to the accompanying drawings, in which.

Figure 2:
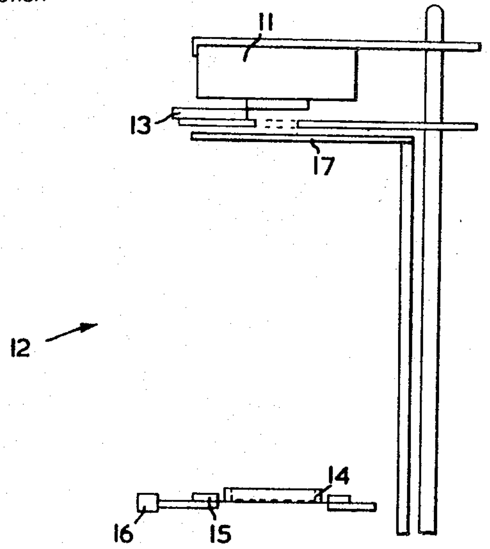
FIG. 2 is a diagram of apparatus for forming the device of FIG. 1.

Referring to FIG. 2, a prepared single crystal of tellurium is mounted on a heater 11 in a vacuum deposition chamber 12. The temperature of the tellurium crystal is measured by a thermocouple 13. A glazed porcelain boat 14 is mounted within the chamber opposite the crystal, the boat 14 being heated by a molybdenum filament 15 supplied from a low voltage supply 16. Selenium is melted in the boat 14 so that selenium vapour is given off and is deposited on the crystal. The deposition is controlled by a shutter assembly 17 mounted between the crystal and the boat.

In one example, a single tellurium crystal is prepared and mounted in the apparatus of FIG. 2 with its $(10\bar{1}0)$ face exposed. The $(10\bar{1}0)$ face of the tellurium crystal is prepared by cleavage. To provide a completely flat surface this face may also be ground and polished. A polishing agent which produces a highly polished, scratch-free surface such as stannous oxide, is suitable. To minimise atmospheric contamination, the prepared tellurium crystal is transferred as rapidly as possible to the vacuum evaporator. Before deposition of the selenium, the tellurium is annealed under vacuum at a temperature high enough to re-crystallise the disturbed surface layer and drive off any volatile surface contamination. The shutter assembly enables the selenium to be out-gassed without contamination of the tellurium.

The annealing process of the tellurium reduces surface contamination in the case of cleaved surfaces, and so increases the degree of orientation of the selenium layer. With polished substrates, annealing is essential to re-crystallise the amorphous layer produced by polishing. Annealing for two hours at a temperature of between 170° C. and 210° C. was found to be satisfactory.

The tellurium substrate was maintained at a temperature within the range of 70° C. to 140° C. for the deposition of selenium from the vapour at a rate of 2,000 A./minute onto the $(10\bar{1}0)$ face of the tellurium. It was found that maximum orientation was obtained when the temperature lay within the range 106° C. to 125° C. The temperature ranges are different for different deposition rates.

Figure 1:
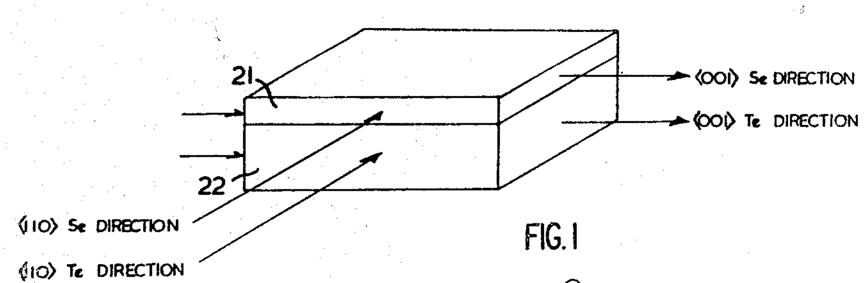
FIG. 1 is a diagram of a single crystal layer of selenium grown in a single crystal of tellurium.

The thickness of the selenium layer deposited is controlled by regulating the time of exposure of the tellurium to the vapour beam. The working pressure of the evaporation system is in this case in the range of $10^{-5}$ torr. FIG. 1 shows diagrammatically a $(10\bar{1}0)$ layer of selenium 21 deposited on a single crystal tellurium substrate 22.

In a second example, the (0001) face of a single tellurium crystal was prepared by accurate cutting followed by grinding and polishing, and annealing to re-crystallise the disturbed surface layer of the tellurium. The selenium layer subsequently deposited was found to be a single crystal layer in parallel orientation to the tellurium (0001) face.

When it is reqiured to separate the selenium layer from the tellurium, the tellurium is dissolved in dilute nitric acid. In order to provide the selenium layer with sufficient strength and to prevent damage to the selenium during dissolution, a coating of collodion is applied to the exposed selenium surface before the tellurium is removed. Annealing of amorphous selenium films after separation from the tellurium surface produces a large degree of orientation of the selenium layer.

At higher temperatures of the tellurium (above 125° C. particularly) the deposition of selenium is controlled by its tendency to re-evaporate, and this tendency can be overcome by increasing the number of atoms arriving at the surface.

The tellurium need not be heated, but selenium may be applied by vacuum deposition onto the tellurium surface at room temperature to provide an amorphous layer, the amorphous layer being subsequently annealed with or without the substrate. Annealing of the substrate and selenium for one hour at 90° C. was found to produce selenium layers giving single crystal electron-diffraction patterns, although very low angle grain boundaries were found to be present. Annealing of the selenium stripped from the tellurium substrate was found to produce a large degree of orientation of the resultant layer.

Selenium may be applied to the tellurium in a variety of ways known to give epitaxial growth, for example by electrodeposition from solution or by decomposition of a selenium-containing compound on the substrate surface.

A further epitaxial single crystal layer may be deposited on the selenium layer to produce single crystal multiple layer devices.

Figure 3:
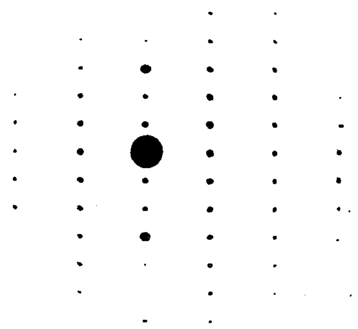
FIG. 3 is an electron diffraction pattern showing a single crystal selenium film grown on cleaved $(10\bar{1}0)$ tellurium at 93° C. and having a thickness of approximately 1000 A.

A typical electron diffraction pattern from the film is shown in FIG. 3. This shows a single crystal selenium film grown on cleaved $(10\bar{1}0)$ tellurium at 93° C. and having a thickness of approximately 1,000 A. This pattern did not vary in any way on sweeping across the area of the film, and indicates a single orientation of the selenium $(10\bar{1}0)$ plane on the substrate. This confirms that the film is a single crystal. As in previously grown films of selenium, forbidden 0001 and 0002 reflections are present in the diffraction pattern.

I claim:

1. A coated article comprising a single crystal tellurium substrate with an epitaxial coating of selenium.

2. The coated article of claim 1 wherein the selenium coating is on the $(10\bar{1}0)$ face of said single crystal tellurium substrate.

3. The coated article of claim 1 wherein the selenium coating is on the (0001) face of said single crystal tellurium substrate.

4. A method of producing a coated article comprising a single crystal tellurium substrate with an epitaxial coating of selenium comprising depositing selenium on said tellurium substrate from selenium vapor, melting said selenium on the tellurium substrate and slowly cooling the selenium thereby forming a selenium layer with single crystal orientation.

5. A method of producing a coated article comprising a single crystal tellurium substrate with an epitaxial coating of selenium comprising vacuum depositing selenium on said tellurium substrate which is maintained at a temperature in the range of 70° C. to 140° C.

6. A method of producing a coated article comprising a single crystal tellurium substrate with an epitaxial coating of selenium comprising vacuum depositing selenium on said tellurium substrate which is maintained at a temperature below 70° C. and wherein the selenium deposited thereon is annealed thereby producing a precisely oriented selenium layer.

References Cited

UNITED STATES PATENTS

| | | | |
|---|---|---|---|
| 2,739,079 | 3/1956 | Keck | 117—106 X |
| 2,753,278 | 7/1956 | Bixby et al. | 117—106 X |
| 2,970,906 | 2/1961 | Bixby | 23—209 |
| 3,186,880 | 6/1965 | Skaggs et al. | |
| 3,336,159 | 8/1967 | Liebson | 117—201 |
| 3,335,038 | 8/1967 | Doo | 148—175 |

ANDREW GOLIAN, Primary Examiner

U.S. Cl. X.R.

117—106, 121